United States Patent [19]
Durbin

[11] Patent Number: 5,414,251
[45] Date of Patent: May 9, 1995

[54] READER FOR DECODING TWO-DIMENSIONAL OPTICAL INFORMATION

[75] Inventor: Dennis A. Durbin, Cedar Rapids, Iowa

[73] Assignee: Norand Corporation, Cedar Rapids, Iowa

[21] Appl. No.: 284,883

[22] Filed: Jul. 28, 1994

Related U.S. Application Data

[63] Continuation of Ser. No. 849,771, Mar. 12, 1992, abandoned.

[51] Int. Cl.⁶ .................................................. G06K 7/10
[52] U.S. Cl. ............................... 235/462; 235/470; 235/472; 382/321; 348/333
[58] Field of Search .................. 235/456, 462, 472; 382/59; 358/224

[56] References Cited

U.S. PATENT DOCUMENTS

| | | | |
|---|---|---|---|
| 4,044,227 | 8/1977 | Holm et al. | 235/61.7 |
| 4,360,798 | 11/1982 | Swartz et al. | 235/463 |
| 4,369,361 | 1/1983 | Swartz et al. | 235/470 |
| 4,764,668 | 8/1988 | Hayard | 235/470 |
| 4,786,792 | 11/1988 | Pierce et al. | 235/456 |
| 4,822,986 | 4/1989 | Gothmueller et al. | 235/470 |
| 4,877,949 | 10/1989 | Danielson et al. | 235/462 |
| 5,107,100 | 4/1992 | Shepard et al. | 235/472 |
| 5,117,098 | 5/1992 | Swartz | 235/472 |
| 5,124,539 | 6/1992 | Krichever et al. | 235/472 |
| 5,212,371 | 5/1993 | Boles et al. | 235/472 |

FOREIGN PATENT DOCUMENTS

| | | |
|---|---|---|
| 0349770 | 1/1990 | European Pat. Off. . |
| 0385478 | 9/1990 | European Pat. Off. . |
| 0120388 | 5/1988 | Japan .................. 382/59 |
| 0100684 | 4/1989 | Japan .................. 382/59 |

OTHER PUBLICATIONS

IBM Technical Disclosure Bulletin, vol. 21, No. 2, pp. 436–437, Jul. 1978.
Hitachi Ltd., vol. 13, No. 66, p. 828, Oct. 1988.

Primary Examiner—Andrew M. Dolinar
Assistant Examiner—Erick Solis
Attorney, Agent, or Firm—Suiter & Associates

[57] ABSTRACT

A scanner for reading two-dimensional optical information sets is described which includes a housing for supporting a photosensitive array associated with an optical string adapted to focus optical information on the array. Also provided are array and optical string controls for controlling the array and optical string such that the output of selected images on the array are processed via pattern recognition means. Images recognized to contain decodable optical information are displayed and highlighted by a display. In this fashion a user is assisted in aiming, recognizing, confirming the decodability, and decoding images of optical information incident on the array.

21 Claims, 4 Drawing Sheets

READER FOR DECODING TWO-DIMENSIONAL OPTICAL INFORMATION

CROSS REFERENCE TO RELATED APPLICATIONS

This application is a continuation of U.S. application Ser. No. 07/849,771 filed on Mar. 12, 1992, now abandoned.

BACKGROUND OF THE INVENTION

1. Technical Field

The present invention is directed to optical information readers and more particularly to readers adapted to selectively decode two-dimensional optical information sets.

2. Description of the Prior Art

Conventional bar code symbols have small data storage capacities. This reduces the utility of conventional bar code scanner and reader systems. For example, the 11 digit Uniform Pricing Code found on most supermarket items acts as an identifying number which may be utilized to access information in a database. Codes of this type do not carry information along their vertical axis, and are therefore, less prone to skewing errors during decoding.

Two-dimensional bar code symbols or "portable data files" have recently been developed. With codes of this type access to a database is not required since the code contains the information which would normally be keyed for in a database. Since database reliance on a database is not required, information may be accessed and exchanged more readily and reliably. However, in order to decode two-dimensional codes a more sophisticated apparatus is required. This is primarily true since normal vertical code redundancy is not present, making code registration, orientation, and condition very important.

Several two-dimensional coding standards have been proposed, e.g., Code 49, 16K, Identicode MLC-2D, and Code PDF417. While such codes are capable of storing information such as price, name of product, manufacturer, weight, expiration date, inventory data, shipping information, and the like; apparatus which assist the user in aiming and decoding two-dimensional codes are not currently available.

For example, two dimensional codes might consist of a stack of conventional linear codes. The first line might contain pricing information, the second the product name, the third name of the manufacturer, and successive lines might contain product weight, expiration date, inventory data, shipping information, and the like. Additionally, a user may require the ability to selectively send portions of the decoded bar code symbol.

OBJECTS OF THE INVENTION

Therefore, it is a principal object of the present invention is to provide a scanner adapted to selectively read two-dimensional optical information sets.

Another object of the present invention is to provide a scanner adapted to selectively read two-dimensional optical information sets in ambient light.

Another object of the present invention is to provide a scanner adapted to selectively read two-dimensional optical information sets from a wide range of distances.

Another object of the present invention is to provide a scanner adapted to selectively read two-dimensional optical information sets while assisting a user in aiming the reader.

Another object of the present invention is to provide a scanner adapted to selectively read two-dimensional optical information sets which is economical to manufacture and durable in use.

Finally, another object of the present invention is to provide a scanner adapted to selectively read two-dimensional optical information sets which is efficient in operation, simple in construction, easy to use, and trouble free. These and other objects will be apparent to those skilled in the art.

SUMMARY OF THE INVENTION

The present invention discloses a novel scanner for reading two-dimensional optical information sets. In one exemplary embodiment the invention includes a housing for supporting a photosensitive array associated with an optical string means which is adapted to focus optical information on the array. Also provided are array and optical string control means for controlling the array and optical string such that the output of selected images on the array are processed via pattern recognition means. Images recognized to contain decodable optical information are displayed and highlighted by the display means. In this fashion a user is assisted in aiming, recognizing, and confirming the decodability of the image incident on the array.

BRIEF DESCRIPTION OF THE DRAWINGS

Other objects and advantages of the invention will become apparent upon reading the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EXEMPLARY EMBODIMENTS

Figure 1:
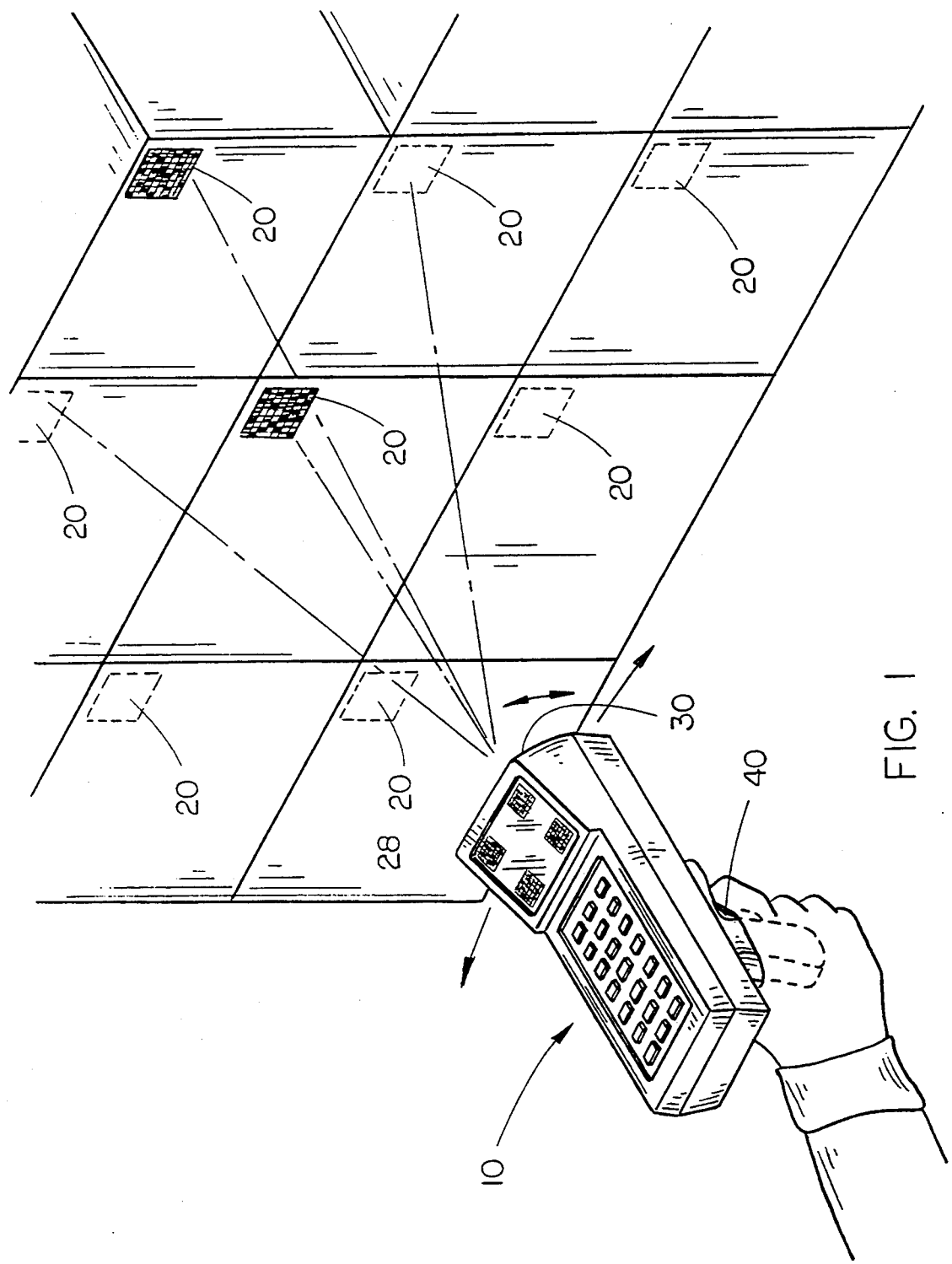
FIG. 1 is a perspective view of a preferred embodiment of the two-dimensional optical information reader showing a user being assisted by the display of the reader in aiming and determining the decodability of a plurality of two-dimensional bar code symbols.
Figure 4:
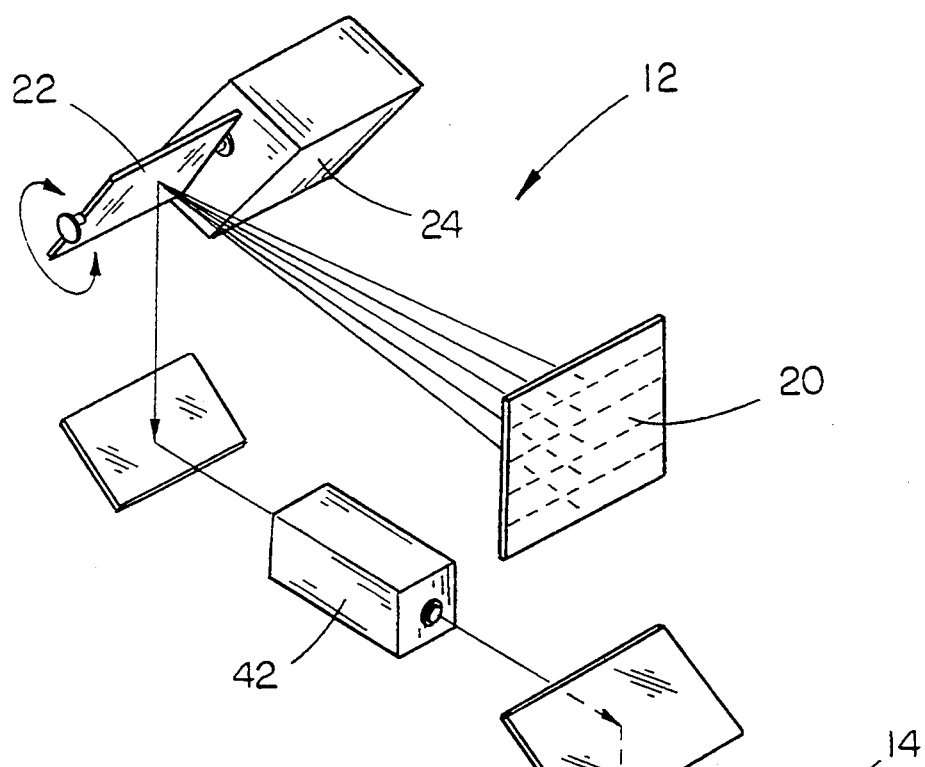
FIG. 4 is a highly diagrammatic perspective view of the image capturing elements of a linear array exemplary embodiment of the present invention.
Figure 5:
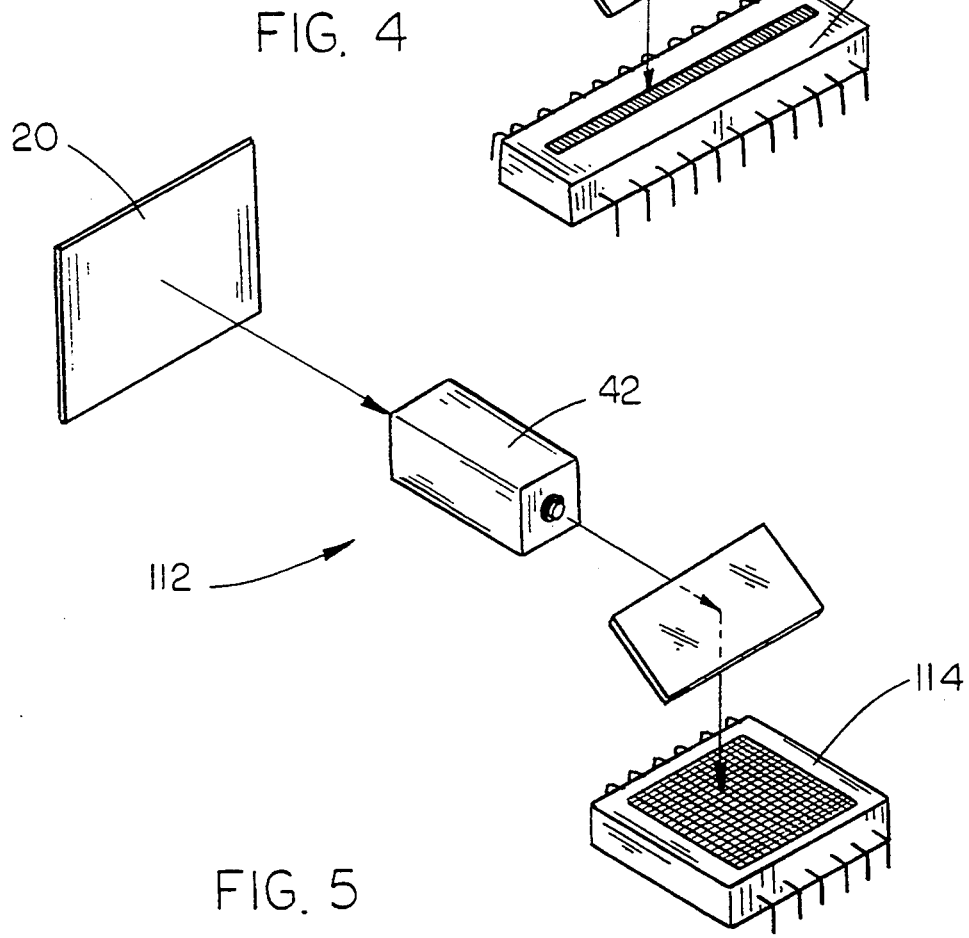
FIG. 5 is a highly diagrammatic perspective view of the image capturing elements of a two-dimensional array exemplary embodiment of the present invention.
Figure 6:
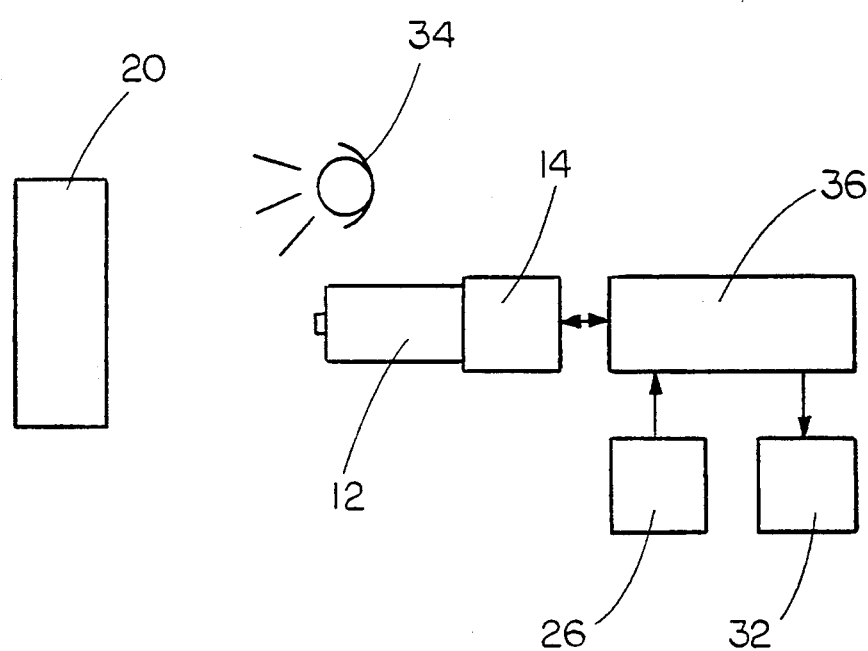
FIG. 6 is a block diagram illustrating the various components of the present invention.

Two preferred exemplary embodiments of the present invention 10 and 100 are illustrated in FIGS. 1 through 6 (FIGS. 1, 4, and 6; and FIGS. 1, 5, and 6, respectively). Both embodiments teach the construction and use of readers capable of decoding "portable data files."

Each exemplary embodiment utilizes image capture means, pattern recognition means, and a real time display for assisting a user in aiming, recognizing, confirming decodability, and decoding two-dimensional bar code symbols. The embodiments (10, 100) differ primarily in the particular construction and operation of their image capture means.

In a first exemplary embodiment 10 the image capture means 12 utilizes a one-dimensional photosensitive array 14 to read images in a horizontal (X) direction and mechanical means 16 to read images in a vertical direction. Conversely, in a second exemplary embodiment 100 the image capture means 112 utilizes a two-dimensional photosensitive array 114 to read images in horizontal (X) and vertical (Y) directions (FIG. 5).

Turning to the first exemplary embodiment 10, having image capture means 12, best illustrated in FIG. 4, vertical components 16 of a two-dimensional bar code symbol 20 are read by rastering succeeding horizontal components 18 across a single line photosensitive array 14. This is accomplished, in such exemplary embodiment, via a mirror 22 rotatably mounted about its horizontal plane. The mirror 22 is rotatably connected and driven by mirror control means 24. In a preferred exemplary embodiment an extremely low mass mirror prism (22) may be utilized and driven by solenoids, a piezo, or the like (24).

In this embodiment 10, an expanded 5,000 pixel single line photosensitive array 14 may be utilized. However, a 2,048 pixel one-dimensional line photosensitive array would also work with a reduced range. A special photosensitive array might also be designed with faster scan line times and reduced power requirements.

Vertical raster (Y) is variable under microprocessor 26 control (FIG. 6). Likewise, the readout speed of the photosensitive array 14 is variable under microprocessor 26 control wherein the readout is preferably based on analyzed data recovered on each scan. Likewise, integration time and gain of sense amplifiers and filters acting on the photosensitive array 14 data may also be variable under microprocessor 26 control.

Additionally, an electronic option to read lower density bar code symbols could also be incorporated wherein every other, every third, or every fifth pixel are read. Likewise, an electronic option to read high density short strings might also be incorporated wherein the left 1,666, then center 1,666, and then right 1,666 pixels are read.

In another exemplary species of this embodiment 10 the photosensitive array shift register drives are built into the array. Electronic control of each charge well might also be provided such that wells not in use would not exist to the microprocessor 26. Such a configuration prevents dark currents from filling empty wells. Additionally, wells are created by the microprocessor 26 just prior to use. Thus, no special cleaning cycles will be necessary.

In another exemplary species of this embodiment 10 the interface could be more parallel wherein multiple photosensitive array 14 shift sections could each shift out their own output, for example, five outputs each shifting 1,000 pixels, or ten at 500 pixels, etc. Such a design would also utilize square pixel dimensions in order to maintain equal vertical and horizontal density.

The image capture means 12 would also include autofocus means. Autofocus could be accomplished via infrared or ultrasonic independent means, or via the use of photosensitive array scans in order to maximize transition sharpness of the received image, or the like. Likewise, the image capture means 12 would also include zoom controlled by the user.

Aiming of the reader 10 would be accomplished by physical proximity for close range (contact to two inches). The use of spotter beams is not desired because of their additional cost and tendency to washout in lighted areas. Aiming of the reader 10 for long range would be accomplished via a display 28 (<1 to 20 plus feet). The display 28, in a preferred exemplary embodiment 10, would be a one inch CAT, dedicated LCD graphics screen, or even terminal screen on an integrated scanner.

Figures 2, 3:
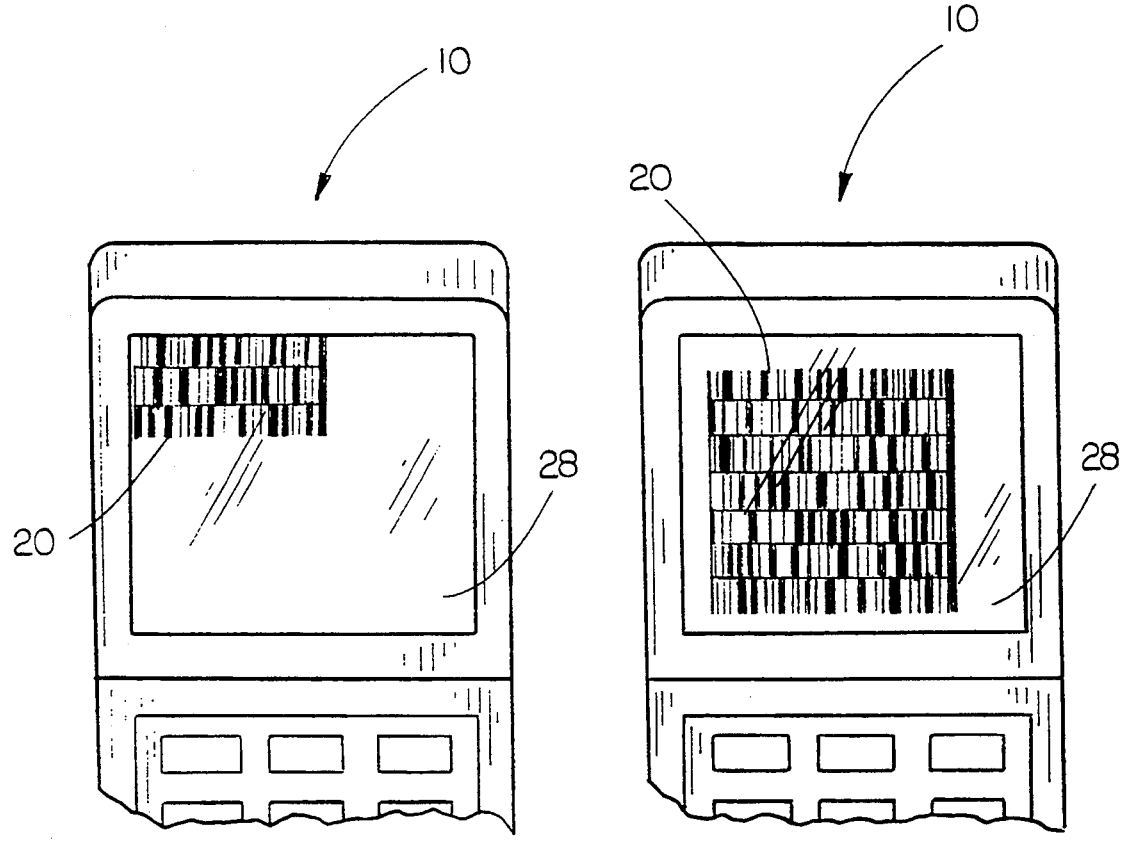
FIG. 2 is a partial top perspective view of the reader illustrating the display wherein the display indicates to a user that a two-dimensional, decodable, bar code symbol may be read if the user adjusts the aim of the reader to the left and above.
FIG. 3 is a partial top perspective view of the reader illustrating the display wherein the display indicates to a user that a two-dimensional, decodable bar code symbol is centered in view and available for reading.

In such an embodiment 10 low resolution scanning may be performed while aiming. Image processing techniques would then be utilized to display lines and shadows with sufficient aiming detail (FIGS. 1, 2, and 3). The microprocessor 26 would then utilize pattern recognition techniques to locate rectangular shapes (or other information encoded shapes). Where the microprocessor 26 locates rectangular shapes (or other information encoded shapes) which might be decodable bar code symbols, the closest such shape to the center of the reader 10 window 30 would then be displayed on the display 28 in a highlighted manner, e.g., flashing, reverse video, or the like. During this same time period the microprocessor 26 may also make an attempt to decode the contents within the highlighted area. Then, if the decode attempt is successful, the highlighted area could return to normal, or the like, in order to notify the user that the decode was successful and that the user may either accept or reject the data. If the data is from the wrong bar code symbol, or the wrong portion of a correct bar code symbol, then the user may aim at a new area without accepting the data.

The use of zoom during aim induces jitter, therefore, in order to overcome this problem, more data may be scanned than is viewed on the display 28. If 1,000 pixels are collected but only 700 are viewed on the display 28, then the microprocessor 26 may compare general patterns of each scan to detect motion and adjust the data sent to the display 28 to compensate for the motion. Additionally, as the displayed portion of the collected pixel picture reaches a boundary of the pixel picture, then the displayed picture would start to move such that the center of the collected data is now shown as the displayed picture. In another species of an exemplary embodiment 10 all rectangular areas within the displayed area may be highlighted to indicate to a user which areas are probable bar codes, and may annunciate that bar code symbol, or portion thereof, which the microprocessor 26 is currently attempting to decode.

Illumination might come from an internal source, LED's or such, where the light 34 would be on continuously during the aiming and decoding. The light 34 would be variable under processor control in order to reduce power consumption. Additionally, local illumination would only be used out to a nominal distance. Beyond this, ambient light would contribute more and more of the actual bar code illumination. While indoors, flood lighting or indoor overhead lights would be necessary. The intention of this design is such that if the user can see the bar code, the reader 10 will also, and decoding is possible.

Neural network and fuzzy logic processor programming and hardware design/architecture are both required. Digital signal processing techniques may also be used to help improve the basic data collected as far as signal level normalization within the bar code rectangular areas, taking advantage of bar codes still being printed in 2 colors only. Neural network concepts of weighted inputs and highly parallel processing would be used during aiming while looking for potential bar code 20 rectangles.

The use of concise dedicated functional neural processor, each with a single function, all reduced to silicon and all placed in a single ASIC is preferred. In this manner, 20 microprocessors, wherein one looks for a vertical line, another for a horizontal line, and another for angles, and the like, could all be examining the same data base at the same time. Very high speed data (image) evaluation will also be utilized in a preferred embodiment for both aiming and decoding. The same microprocessors might also be responsible for power control in the image capture means 12. Additionally, it is preferred that not all processing functions be powered at all times or at the same time. Also, illumination would end and count (data) collection would cease after data was decoded. A communication processor could also be provided and such communication processor could be functional until data was transferred.

A typical operation might be as follows: The user directs the reader 10 toward the bar codes 20 to be read (FIG. 1). The user pulls a trigger means 40 to activate the aiming sequence. The user views the display 28 to verify reader 10 aim. The reader 10 auto focuses, starting with the focus setting of the previous read. The user views the display 28 and moves the reader 10 and starts to zoom as necessary as the desired bar code symbol 20 comes into view (FIG. 2). The reader 10 continues to show the viewed field in the display 10 even as it decodes the bar code symbol 20. The reader 10 highlights the decoded bar code symbol 20 (FIG. 3). The user may accept the decoded data via the trigger means 40, or the like. If the user does not want the data, he or she may move the reader 10 such that another desired bar code symbol 20 is centered and highlighted as decoded, or such that no bar code is highlighted and no decode would occur.

This is very beneficial in that one bar code can be selected on a page containing many adjacent codes without the sometimes impossible requirement of ensuring the scan line (laser) goes through only the desired code.

While the invention has been described with a certain degree of particularity, it is manifest that many changes may be made in the details of construction and the arrangement of components without departing from the spirit and scope of the disclosure. It is understood that the invention is not limited to the embodiments set forth herein for purposes of exemplification, but is to be limited only by the scope of the appended claims including the full range of equivalency to which each element thereof is entitled.

Thus, there has been shown and described an improved two-dimensional optical information reader which accomplishes at least all of the stated objects.

I claim:

1. An apparatus for reading two-dimensional optical information, comprising:
   (a) a housing having an opening;
   (b) a photosensitive array mounted within said housing;
   (b) optical string means associated with said array and said opening of said housing for focusing optical information on said array;
   (c) array and optical string control means for controlling said array and optical string;
   (d) memory means for storing output from said array;
   (d) pattern recognition means for assisting a user in recognizing and confirming the decodability of optical information;
   (e) display means associated with said housing for displaying an image of said array output, as processed by said pattern recognition means, said display means further including optical information decodability indication means;
   (f) user feedback means, providing user interface with said apparatus, for facilitating user control over said optical string means, array, and display means;
   (g) decoding means for decoding optical information; and
   (h) electrical power supply means for providing power for the operation of said apparatus.

2. The apparatus of claim 1, wherein said housing is of a size and shape suited for hand-held operation.

3. The apparatus of claim 1, wherein said photosensitive array is a one-dimensional array.

4. The apparatus of claim 3, wherein said optical string further comprises means for rastering one-dimensional image segments of a two-dimensional image onto the photosensitive regions of said array.

5. The apparatus of claim 1, wherein said photosensitive array is a two-dimensional array.

6. The apparatus of claim 1, further comprising zoom means for changing the image height of an object focused on said array.

7. The apparatus of claim 1, further comprising focusing means for variably focusing the image of an object on said array.

8. The apparatus of claim 1, wherein said memory is volatile.

9. The apparatus of claim 1, wherein said pattern recognition and optical information decoding means includes parallel processor means controlled at least in part by a fuzzy logic instruction set for both aiming and pattern recognition of likely optical information.

10. The apparatus of claim 1, wherein said optical string means further comprises auto focus means.

11. A process for reading two-dimensional optical information, comprising:
   (a) directing a scanner at two-dimensional optical information to be read, wherein said scanner includes;
      (1) a housing having an opening,
      (2) a photosensitive array mounted within said housing,
      (3) optical string means associated with said array and said opening of said housing for focusing optical information on said array,
      (4) array and optical string control means for controlling said array and optical string,
      (5) memory means for storing output from said array, (6) pattern recognition means for assisting a user in recognizing and confirming the decodability of optical information, (7) display means associated with said housing for displaying an image of said array output, as processed by said pattern recognition means, said display means further including optical information decodability indication means, (8) user feedback means, providing user interface with said scanner, for facilitating user control over said optical string means, array, and display means, (9) decoding means for decoding optical information, and

(10) electrical power supply means for providing power for the operation of said scanner;

(b) activating said pattern recognition means via said user feedback means such that a representation of the image incident upon said array is displayed by said display means;

(c) verifying that the image displayed by said display means is optical information via said decoding means;

(d) adjusting the aim of said scanner such that the display optimally indicates that optical information is both incident on said array as displayed by said display means and decodability indication means;

(e) selecting, via said user feedback means, at least one of the steps of (1) accepting said decoded optical information such that said information is recorded and (2) rejecting the optical information such that the decoded optical information is declined.

12. The process of claim 11, wherein said housing is of a size and shape suited for hand-held operation.

13. The process of claim 11, wherein said photosensitive array is a one-dimensional array.

14. The process of claim 13, wherein said optical string further comprises means for rastering one-dimensional image segments of a two-dimensional image onto the photosensitive regions of said array.

15. The process of claim 11, wherein said photosensitive array is a two-dimensional array.

16. The process of claim 11, further comprising zoom means for changing the image height of an object focused on said array.

17. The process of claim 12, further comprising focusing means for variably focusing the image of an object on said array.

18. The process of claim 11, wherein said memory is volatile.

19. The process of claim 11, wherein said pattern recognition and optical information decoding means includes parallel processor means controlled at least in part by a fuzzy logic instruction set for both aiming and pattern recognition of likely optical information.

20. The process of claim 11, wherein said pattern recognition means is comprised of a neural network.

21. The process of claim 11, wherein said optical string means further comprises auto focus means.

* * * * *